US007543768B2

(12) United States Patent
Cohen et al.

(10) Patent No.: US 7,543,768 B2
(45) Date of Patent: Jun. 9, 2009

(54) FOOD PROCESSOR APPLIANCE FOR CUTTING FOOD ARTICLES INTO DESIRED FORMS

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 131 days.

(21) Appl. No.: 11/647,253

(22) Filed: Dec. 29, 2006

(65) Prior Publication Data

US 2008/0156204 A1 Jul. 3, 2008

(51) Int. Cl.
*A47J 44/00* (2006.01)

(52) U.S. Cl. .......................... 241/36; 83/356.2; 83/932; 99/537; 241/37.5; 241/94; 241/100

(58) Field of Classification Search .................. 241/94, 241/36, 37.5, 273.1, 100; 83/399, 400, 932, 83/356.2, 167; 99/537, 492
See application file for complete search history.

(56) References Cited

U.S. PATENT DOCUMENTS 4,113,188 A 9/1978 Belinkoff
D250,568 S 12/1978 Belinkoff
4,184,641 A 1/1980 Coggiola
4,546,928 A 10/1985 Suzuki
4,928,893 A 5/1990 Prindle
5,445,332 A 8/1995 Shimizu et al.
D366,984 S 2/1996 Hsu
D368,622 S 4/1996 Izumi
D369,511 S 5/1996 Chen
6,748,853 B1 6/2004 Brady et al.
D564,829 S 3/2008 Cohen et al.

OTHER PUBLICATIONS

Notice of Allowance Dated Dec. 31, 2007 From the US Patent Office Re.: U.S. Appl. No. 29/287,124.
Official Action Dated Sep. 19, 2007 From the US Patent Office Re.: U.S. Appl. No. 29/287,124.

*Primary Examiner*—Mark Rosenbaum

(57) ABSTRACT

A food processor appliance for cutting food articles into a desired form, includes a housing having a feed chute; a pusher member for pushing food articles through the feed chute into the housing; a cutter device within the housing mounted for reciprocatory movements transversely across the outlet end of the feed chute for cutting food articles fed therethrough into the desired form; and an electrical drive unit including an electrical motor removable from the housing to facilitate cleaning the cutting device. The electrical drive unit includes an interlock electrical switch normally disabling the drive unit but actuatable to enable it, and the feed chute includes an actuator laterally thereof for actuating the interlock electrical switch, and thereby the drive unit, when the drive unit is located in its proper position the top wall of the housing.

17 Claims, 14 Drawing Sheets

80'
91a
91b
83
83a
83b
82
81a
81b
98
88

FOOD PROCESSOR APPLIANCE FOR CUTTING FOOD ARTICLES INTO DESIRED FORMS

FIELD AND BACKGROUND OF THE INVENTION

The present application relates to food processor appliances, and particularly to such appliances for cutting food articles into desired forms.

Many food processor appliances are known for slicing, shredding, or otherwise cutting food articles, such as fruits and vegetables, into various forms. The conventional appliance of this type generally includes rotary cutter or shredder blades, examples of such appliances being described in U.S. Pat. Nos. 4,546,928, 4,928,893 and 6,748,853. Such appliances, however, cannot be used to cut food articles in certain forms, such as into longitudinally-extending sticks or the like; they are also difficult to clean.

Appliances are also known which include reciprocating cutter members, rather than rotary cutter members. An example of an appliance including a reciprocatory cutter member is described in U.S. Pat. No. 5,445,332. However, the known appliances of this type also have a number of drawbacks, particularly with respect to ease of disassembly and reassembly for cleaning purposes, and/or the various forms in which the food articles can be cut.

OBJECT AND BRIEF SUMMARY OF THE PRESENT INVENTION

An object of the present invention is to provide a food processor appliance of the reciprocatory cutter member type having advantages in one or more of the above respects.

According to one broad aspect of the present invention, there is provided a food processor appliance for cutting food articles into a desired form, comprising: a housing including a removable top wall; a feed chute carried by the top wall, and removable therewith, the feed chute having an inlet end projecting outwardly of the top wall, and an outlet end leading through the top wall into the housing; a pusher member for pushing food articles through the feed chute into the housing; a cutter device within the housing and aligned with the outlet end of the feed chute, the cutter device being mounted for reciprocatory forward and return movements transversely across the outlet end of the feed chute for cutting food articles fed therethrough into the desired form; and an electrical drive unit including an electrical motor controlled by an on/off switch for reciprocating the cutter device; the electrical drive unit being conveniently attachable to the housing for reciprocating the cutter device, and removable from the housing to facilitate cleaning the cutting device; the electrical drive unit including an interlock electrical switch normally disabling the drive unit, but actuatable to enable the drive unit; the feed chute including an actuator laterally thereof for actuating the interlock electrical switch, and thereby the drive unit, when the drive unit is located in its proper position on the top wall of the housing.

According to further features in the described preferred embodiment, the actuator includes a pin fixed to and extending laterally of the feed chute, the pin being receivable in a socket in the side wall of the electrical drive unit such that the pin, when received in the electrical drive unit, also properly locates the electrical drive unit on the housing top wall. The described preferred embodiment, the feed chute is of a cylindrical configuration, and a drive the side thereof facing the electrical drive unit includes the laterally-extending pin. The side of the electrical drive unit formed with the socket includes a curved recess conforming to the curvature of the feed chute; and the bottom of the electrical drive unit is formed with two further sockets for receiving pins formed at the respective end of the housing top wall to precisely locate the electrical drive unit with respect to the feed chute and housing top wall.

According to a further feature in the described preferred embodiment, the electrical drive unit includes a top wall and opposed side walls formed with recesses configured to serve as hand grips facilitating grasping the electrical drive unit for application to, or removal of, the electrical drive unit with respect to the housing top wall.

As will be described more particularly below, a food processor appliance constructed in accordance with the foregoing features may be conveniently disassembled for cleaning purposes, and then conveniently reassembled for proper operation.

According to another aspect of the present invention, there is provided a food processor appliance for cutting food articles into a desired form, comprising: a housing including a removable top wall; a feed chute carried by the top wall, and removable therewith, the feed chute having an inlet end projecting outwardly of the top wall, and an outlet end leading through the top wall into the housing; a pusher member for pushing food articles through the feed chute into the housing; a cutter device within the housing and aligned with the outlet end of the feed chute, the cutter device being mounted for reciprocatory forward and return movements transversely across the outlet end of the feed chute for cutting food articles fed therethrough into the desired form; and a drive for reciprocating the cutter device; the cutter device including a first blade extending transversely across the path of movement of the cutter holder during its reciprocations; and a group of spaced further blades extending perpendicularly to the first blade and parallel to the path of movement of the cutter holder during its reciprocations, such that the cutter member cuts the food articles into longitudinally-extending strips.

In the described preferred embodiment, the first blade extends substantially horizontally parallel to the removable top wall of the housing, and the group of spaced further blades extends substantially vertically with respect to the removable top wall of the housing.

According to yet another aspect of the present invention, the cutter member includes a blade extending transversely across the path of movement of the cutter holder during its reciprocations; the blade having a cutting edge on each of its opposite ends such as to cut a slice of the food article during both the forward and return reciprocatory movements of the cutter device.

As will be described more particularly below, the foregoing features provide an appliance that can be used for cutting food articles, such as fruits and vegetables, into a wide variety of different forms and shapes, and which can also be conveniently assembled and disassembled for cleaning purposes.

Further features and advantages of the invention will be apparent from the description below.

BRIEF DESCRIPTION OF THE DRAWINGS

The invention is herein described, by way of example only, with reference to the accompanying drawings, wherein.

Figure 1:
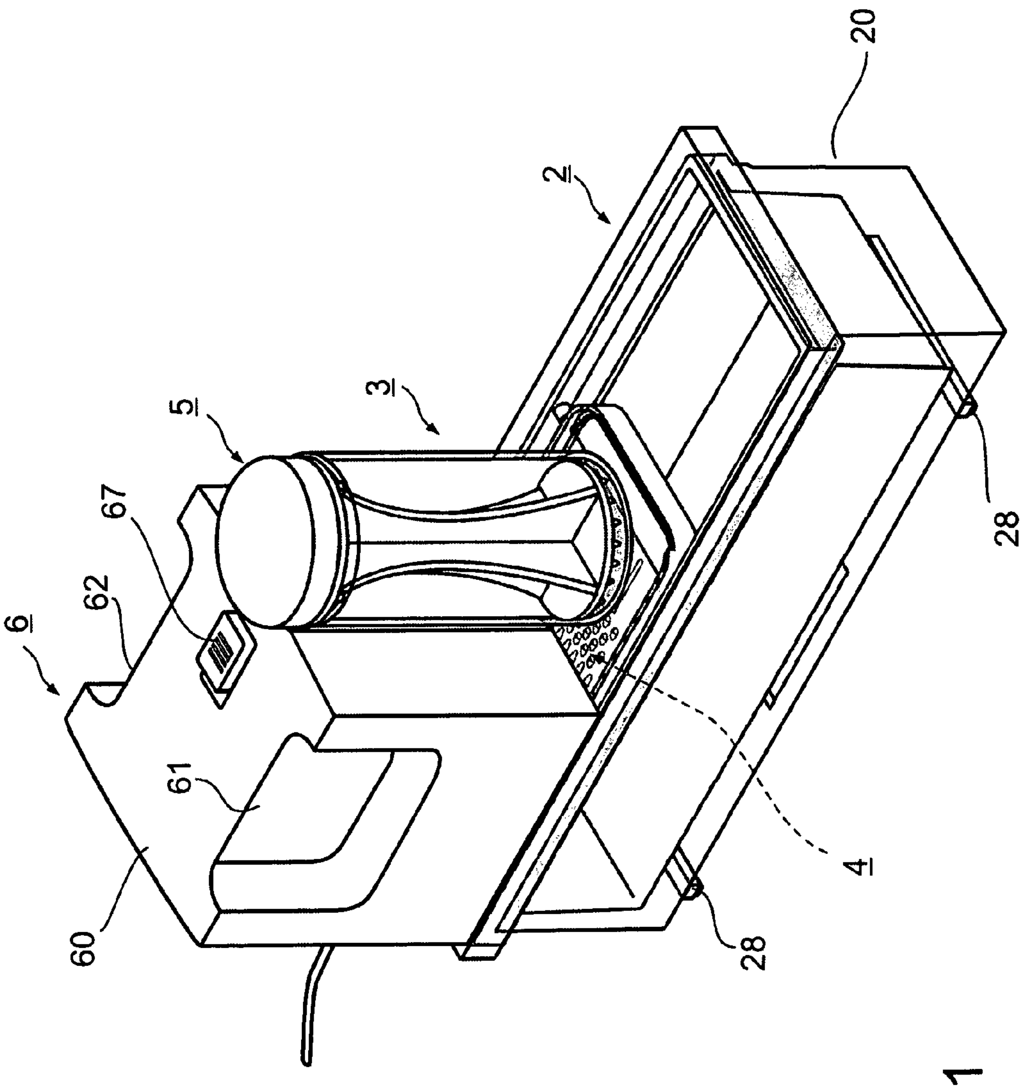
FIG. 1 is an isometric view illustrating one form of food processor appliance constructed in accordance with the present invention.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

The food processor appliance illustrated in the drawings is designed particularly for cutting food articles into various desired forms, such as shreddings, slices, sticks, and the like, and also to permit convenient disassembly and reassembly of the appliance for cleaning purposes.

Figure 2:
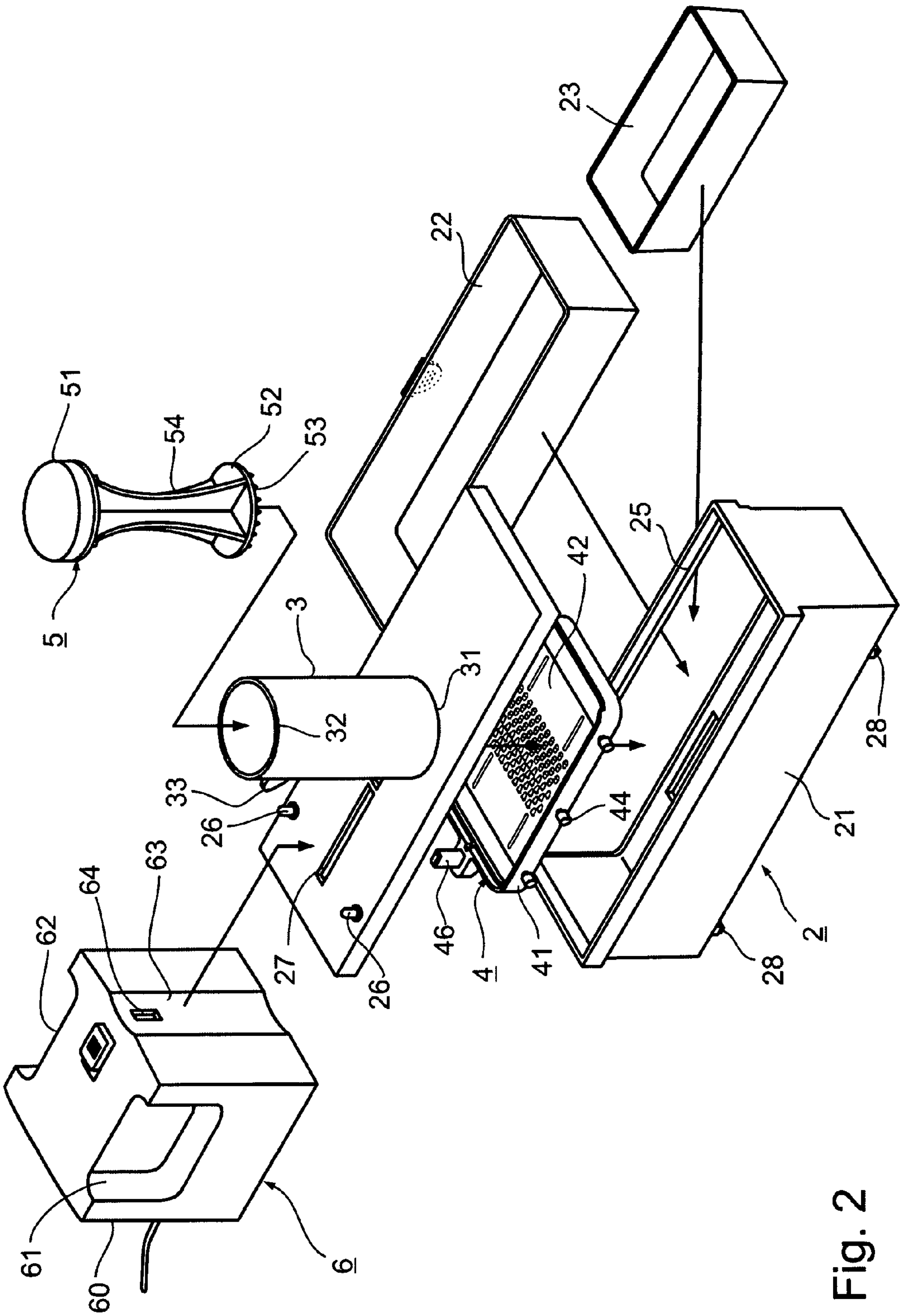
FIG. 2 is an exploded view illustrating the appliance of FIG. 1.

As shown particularly in FIGS. 1 and 2, the appliance includes a housing, generally designated 2; a feed chute 3 for feeding food articles into the housing; a cutter device 4 within the housing mounted for reciprocatory movements for cutting the food articles; a pusher member 5 for pushing the food articles via feed chute 3 into contact with the cutter device 4; and an electrical drive unit 6 for reciprocating the cutter device 4.

FIG. 2 more particularly illustrates the construction of the housing 2, as well as the other components of the appliance. As shown in FIG. 2, housing 2 includes an outer housing member 21, an inner removable liner 22, and a removable receptacle 23 received within the housing to underlie the cutter device 4 for receiving the cuttings produced thereby. The top of the housing is closed by a removable top wall 24. The inner surface of the two side walls of housing member 21 are stepped inwardly to define a pair of longitudinally-extending rails 25 on which the cutter device 4 is mounted for reciprocatory movements under the feed chute 3 carried by the removable top wall 24.

As shown particularly in FIG. 2, the upper end of housing member 21 is formed with a thickened rim 21*a* on three sides, the fourth side being formed with a projecting pin 21*b*. As shown particularly in FIG. 3, the removable top wall 24 is formed on all four sides with a depending flange 24*a* dimensioned to be received with a friction fit over the thickened rim 21*a* of housing member 21. In addition, flange 24*a* engageable with the side of housing member 21 not formed with a thickened rim, but rather formed with projecting pin 21*b*, as shown in FIG. 2, is formed with an opining 24*b* for receiving pin 21*b*.

Such a construction permits removable top wall 24 to be conveniently attached to housing 21 by first passing pin 21*b* through opening 24*b* of the top wall while the top wall is in an angular position with respect to housing member 21, and then pivoting the top wall to cause its depending flange 24*a* to engage the thickened rim 21*a* of housing member 21 with a friction fit.

Removable top wall 24 of housing 2 is further formed with a pair of upstanding pins 26 at one end, and with a longitudinally-extending slot 27 between the pins. As will be described below, pins 26 cooperate with the electrical drive unit 6 to properly locate it in the assembled condition of the appliance, and slot 27 cooperates with electrical drive unit for coupling its reciprocatory drive to cutter device 4 within housing 2.

Housing 2 further includes a pair of resilient strips 28 fixed to the bottom wall of its outer housing member 21 at its opposite ends, to permit the appliance to be stably supported on a flat horizontal surface.

Feed chute 3, through which the food articles are pushed by pusher member 5 into the housing into contact with the cutter device 4 therein, is of cylindrical configuration. Preferably, it is of a relatively large diameter to accommodate whole food articles, so as not to necessitate the cutting of the food articles into smaller pieces before fed into the feed chute.

As shown in FIG. 2, the upper end of feed chute 3 projects outwardly of the removable top wall 24 to facilitate the introduction of feed articles into the feed tube. The opposite end 31 of the feed tube, which serves as its outlet, is preferably fixedly mounted on the removable top wall 24 of housing 2, with the respective edge of feed chute 3 flush with the inner surface of the top wall 24.

The upper end of feed chute 3 includes a projection 33 at the side thereof facing the electrical drive unit 6. As will be described below, projection 33 serves as an actuator for an interlocked switch within electrical drive unit 6 to assure that the electrical drive unit is properly mounted on the appliance before its electrical motor can be energized.

Figure 9:
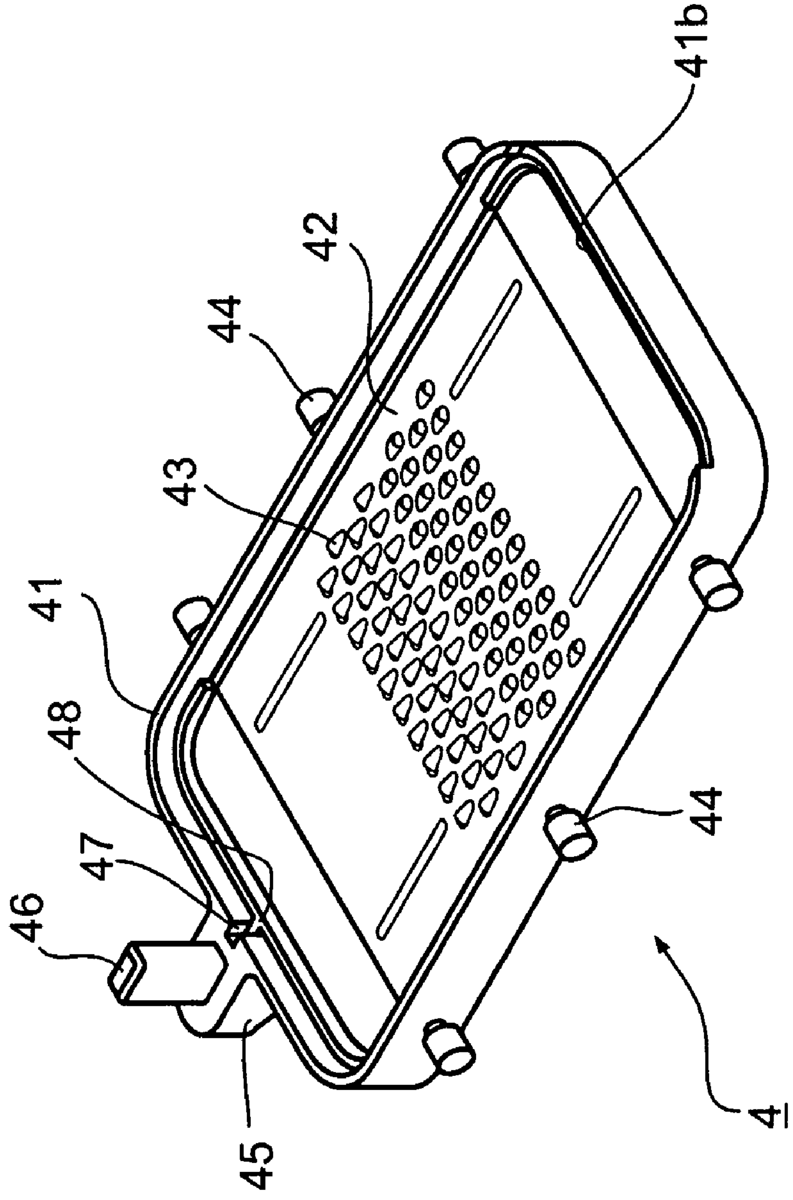
FIG. 9 illustrates the cutter device in the appliance of FIG. 1.

Cutter device 4 is mounted within housing 2 aligned with the outlet end 31 of the feed chute 3. As shown particularly in FIG. 9, cutter device 4 includes an outer holder 41 of rectangular configuration, and a cutter member 42 removably received within holder 41. Cutter member 42 illustrated in FIGS. 2 and 9 is a shredder plate formed with a plurality of curved cutting edges 43 pressed outwardly of the upper surface of the plate for shredding the food articles engaged thereby as they are fed through feed chute 3.

Cutter holder 41 is open at the top but includes a marginal flange 41*a* at the bottom for removably receiving cutter plate 42. In addition, the front wall of holder 41 is formed with a recess 41*b* to facilitate the application and removal of the cutter plate.

Cutter holder 41 further includes a plurality of pins or rollers 44 extending laterally of each side of the holder. These pins or rollers serve to mount the cutter device for reciprocatory movements on rails 25 (FIG. 2) of housing member 21. The end of cutter holder 41 facing the electrical drive unit 6 is formed with a loop 45 for removably receiving a coupling member 46 coupling the cutter device to the electrical drive unit 6. The inner surface of cutter holder 41 is formed with a short slot 47 adjacent to loop 45 for removably receiving a tab 48 formed in the respective end of the cutter member 42 when applying the cutter member to the holder.

Pusher member 5, as best seen in FIG. 2, includes an outer hand-gripping portion 51 to facilitate grasping the pusher member, and an inner circular plate 52 having a diameter slightly smaller than the inner diameter of feed chute 3 to facilitate moving it through the feed chute. The inner surface of circular plate 52 is preferably ribbed, as shown at 53 so as to firmly engage the food articles fed by the pusher member through the feed chute and thereby to firmly press the food articles into contact with the cutter device 4 within the housing 2.

The intermediate portion of pusher member 5, between its hand-graspable end 51 and its food-contacting end 52, is constituted of four crossed-ribs having outer edges of an inwardly-curved configuration. Such a construction efficiently transmits the manual force applied via the outer end 51 of the pusher member to its inner end 52 in contact with the food articles to be cut.

The electrical drive unit 6, as also best seen in FIG. 2, includes a housing 60 of substantially cubical configuration, except that two recesses 61, 62 are formed in the upper portions of two opposed side walls to the top wall. Recesses 61, 62 are configured to serve as hand grips to facilitate grasping the electrical drive unit when applied to, or removed from, housing 2.

In addition, the side wall of housing 60 facing feed chute 3 is formed with a curved recess 63 conforming to the curvature of the outer surface of the feed chute for firmly nesting the electrical drive unit with respect to the feed chute. The upper end of the curved recessed portion 63 of housing 60 includes an opening 64 located to receive projection 33 of the feed chute 3.

Figure 3:
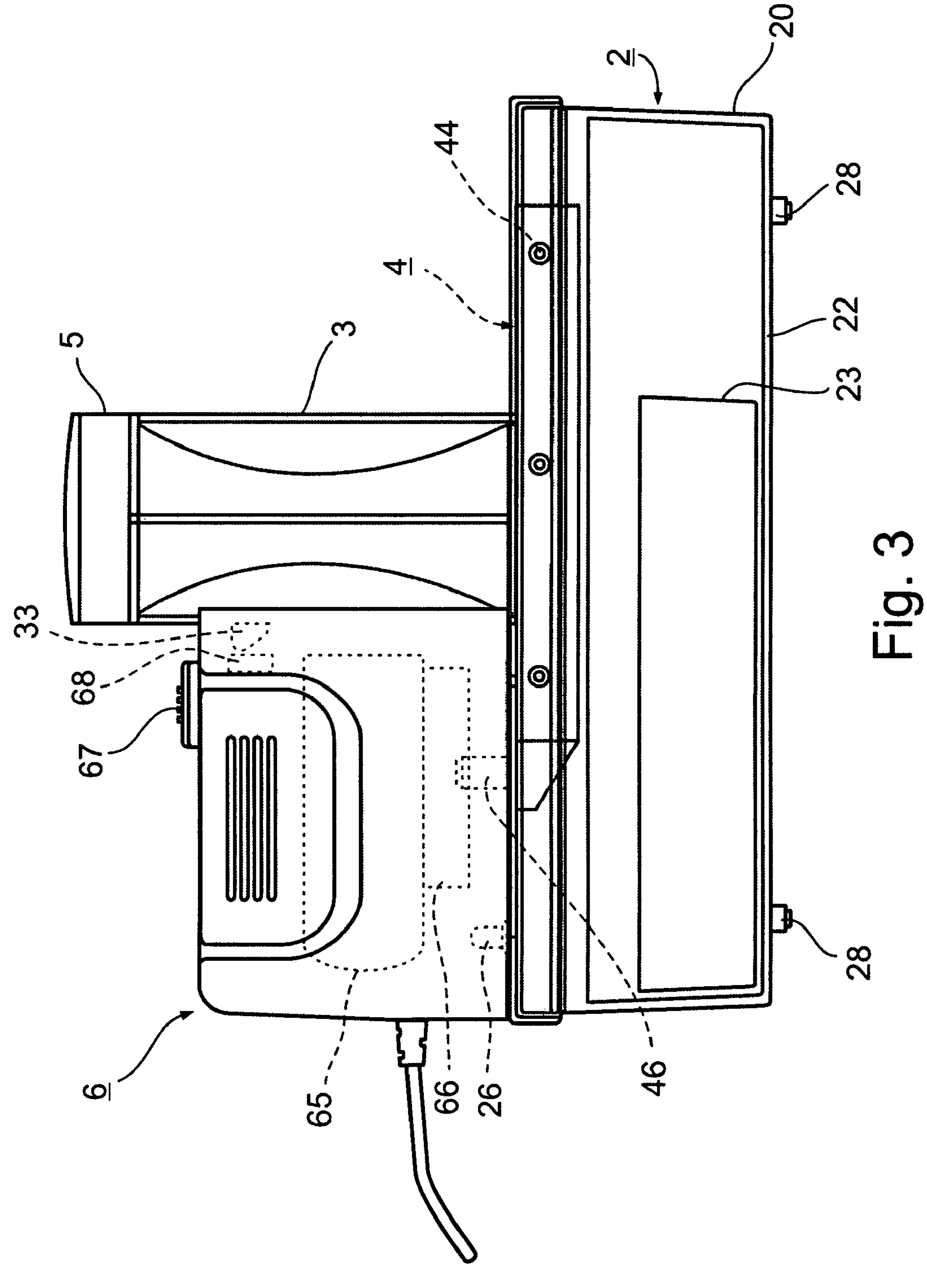
FIGS. 3 and 4 are side views, from opposite sides, of the appliance of FIG. 1.
Figure 4:
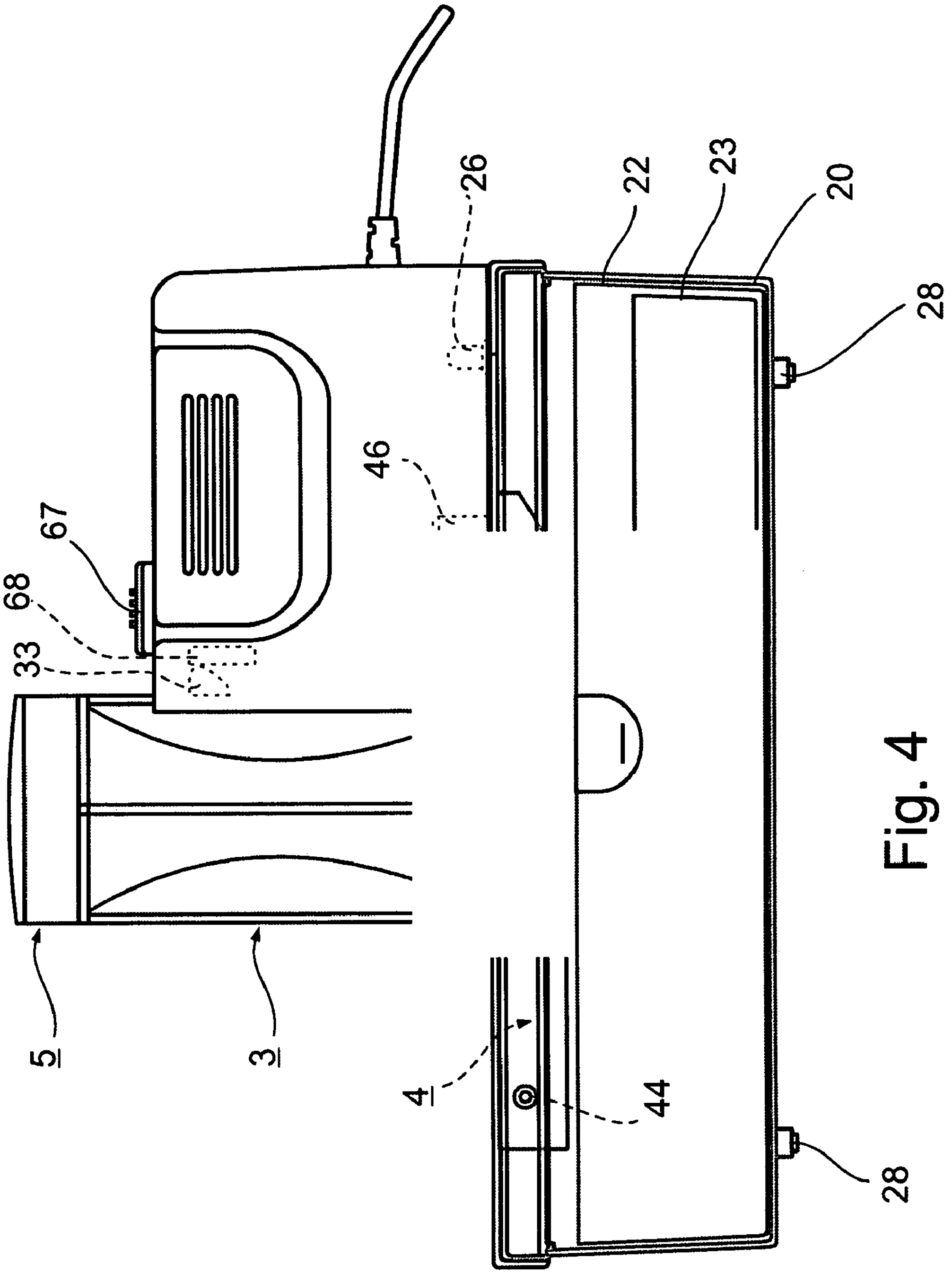
Figure 5:
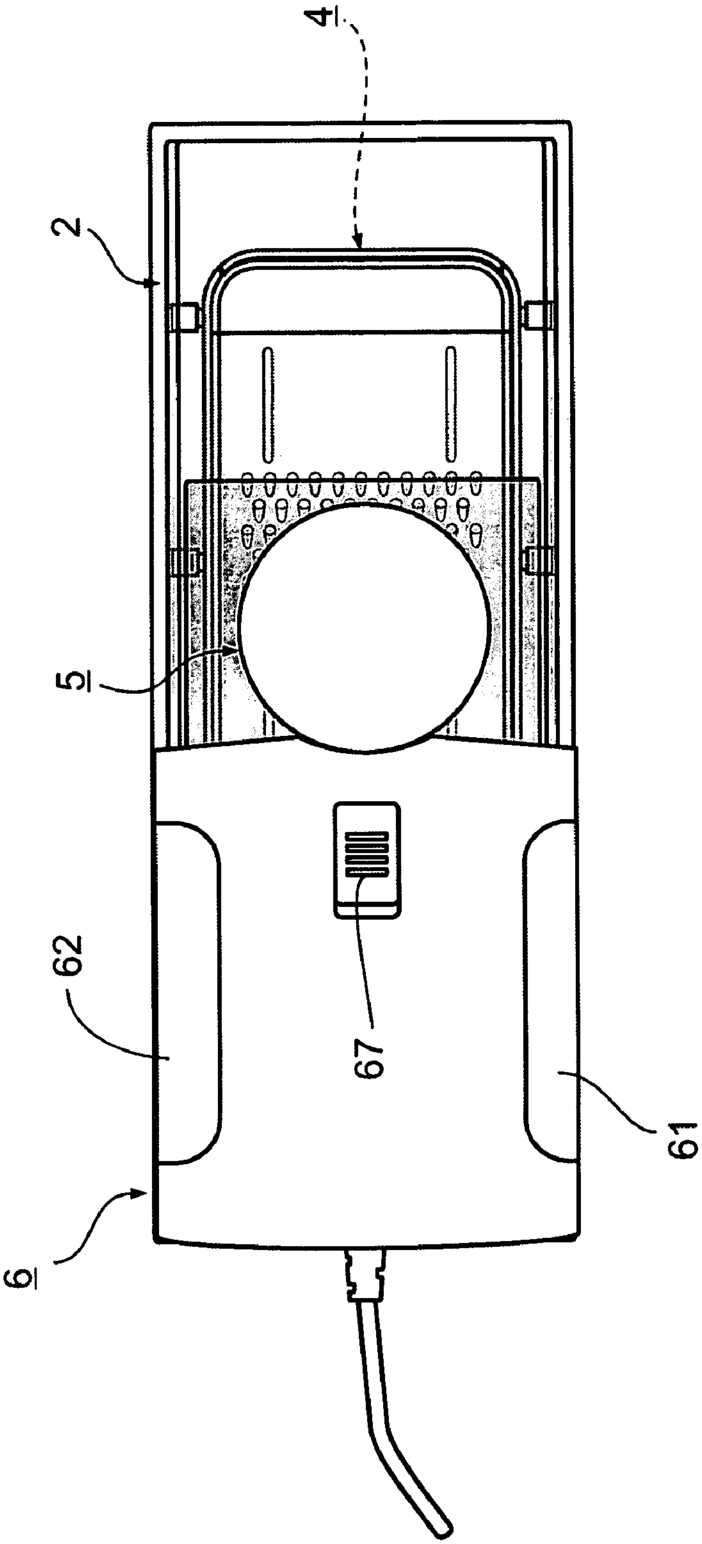
FIGS. 5 and 6 are top and bottom views, respectively, of the appliance of FIG. 1.
Figure 6:
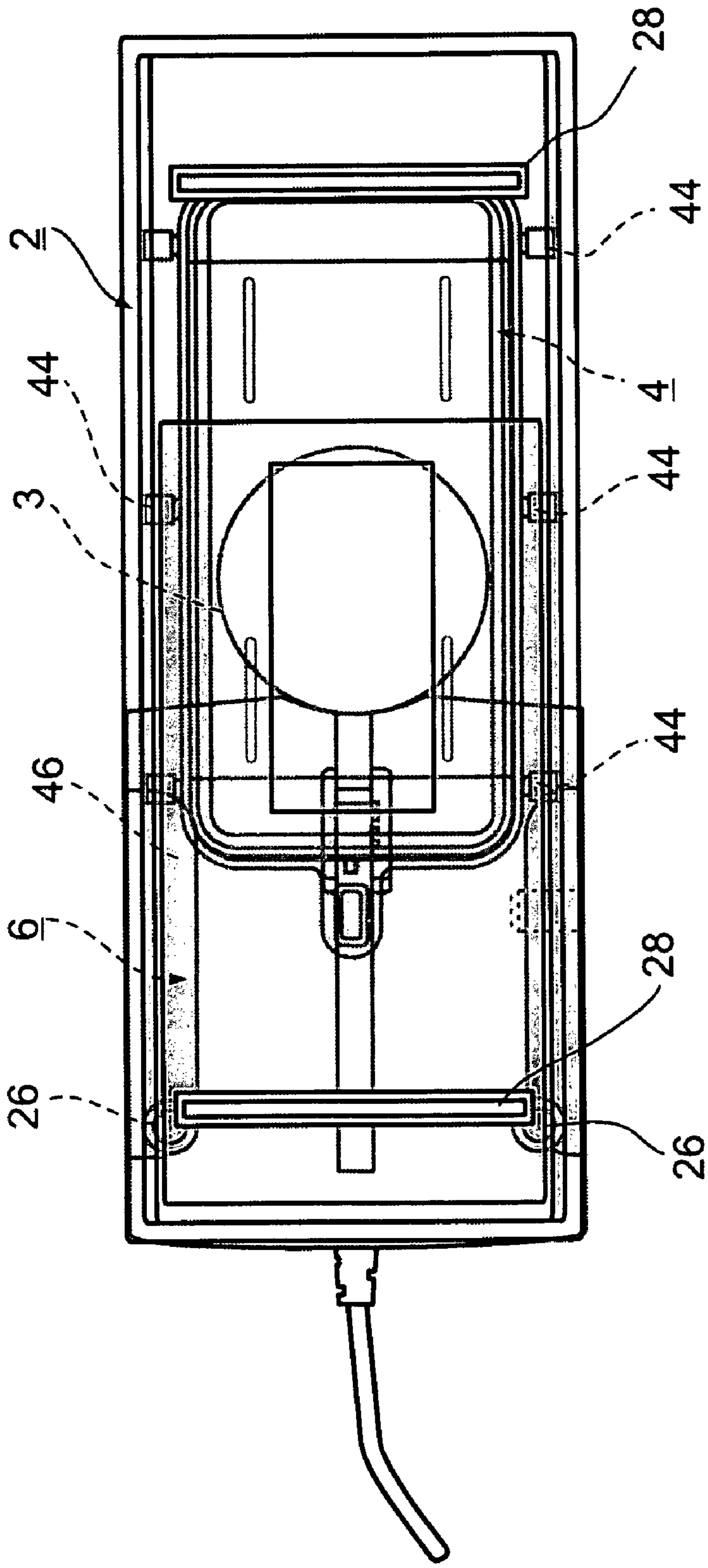
Figure 8:
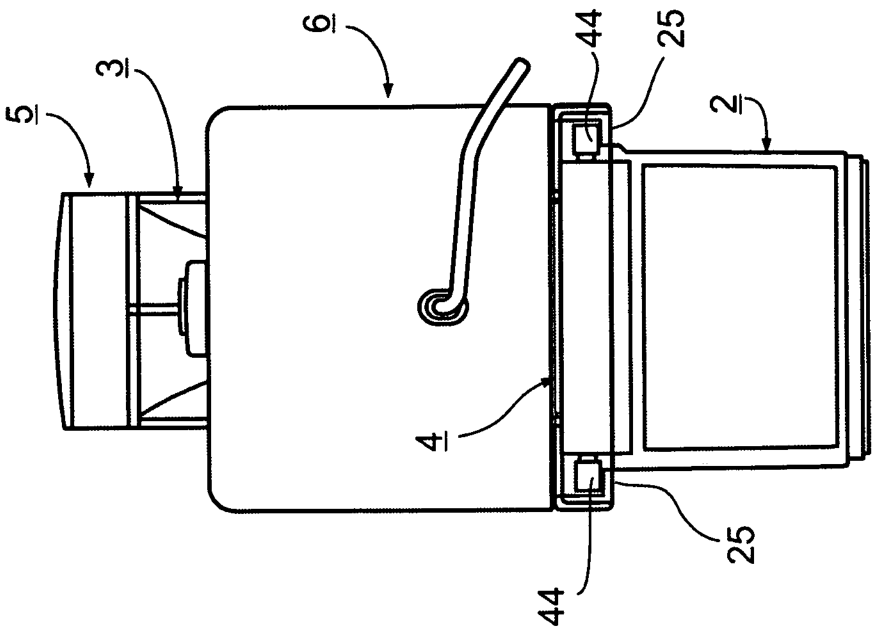
FIGS. 7 and 8 are end views, from opposite ends, of the appliance of FIG. 1.
Figure 7:
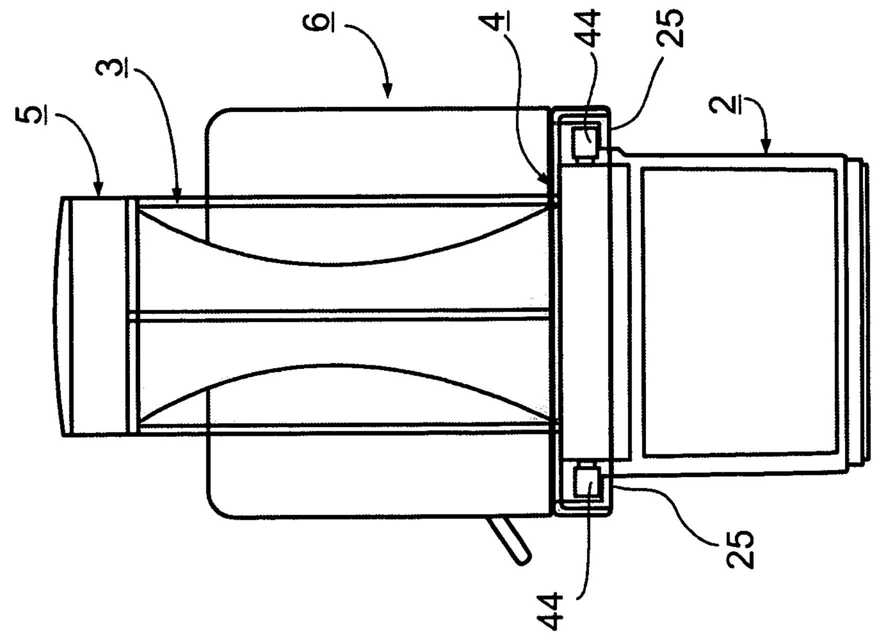

As shown in FIGS. 3 and 4, electrical drive unit 6 includes an electrical motor, schematically shown at 65, together with a mechanism, schematically shown at 66, for converting the rotary movement of the output shaft of the motor to a reciprocatory movement. Many such mechanisms are well known. Mechanism 66 is coupled to link 46 extending through slot 27 of the top wall 24 of housing 2, for reciprocating the cutter device 4 transversely across the outlet end 31 of feed chute 3. An on/off switch 67 is located on the top wall of electrical drive unit 6 for controlling the operation of the motor.

However, as further shown in FIGS. 3 and 4, electrical drive unit 6 further includes an interlock electrical switch 68 which normally disables on/off switch 67 from energizing the electrical motor. Interlock lock switch 68 is located so as to be engaged by projection 33 of feed chute 3, when the electrical drive unit is properly positioned in nesting contact with the feed chute, to enable the on/off switch 67 to energize the electrical motor.

As further seen in FIGS. 3 and 4, the bottom wall of housing 60 is formed with a pair of openings adapted to receive the upstanding pins 26 carried by the top wall 24 of housing 2. Preferably, pins 26 are dimensioned so as to be receivable within the openings formed in the bottom wall of the electrical drive unit with a releasable friction fit.

As will be described more particularly below, the foregoing construction permits the convenient disassembly of the various components of the appliance for purposes of cleaning, and reassembly for continued operation.

The foregoing construction also conveniently permits the selection of the appropriate cutter member to be used according to the desired form into which the food article is to be cut. FIGS. 11*a*-11*d* illustrate the cutter member 42 as being a shredder member for shredding the food articles.

FIGS. 12*a*-12*d* illustrate another type of cutter member, generally designated 70, for cutting the food articles into longitudinally-extending sticks or strips, such as potato sticks or strips. Thus, cutter member 70 includes a mounting plate 71 having a thickness which is reduced along a mid-portion diagonal line 72 to define a reduced thickness in section 73 bordered on opposite sides by walls 74, 75 serving as continuations of the upper surface of main section of mounting plate 71. A first blade 76 is fixed to mounting plate 71 such that the cutting edge of the blade projects slightly past the diagonal wall 72. A group of spaced further blades 77 are fixed to the reduced-thickness section 73 of the mounting plate to extend perpendicularly to blade 76 and parallel to the path of movement of the cutter member 70 during its reciprocations. One end of mounting plate 71 is formed with an axially-extending tab 78, corresponding to tab 48 of cutter member 42 in FIGS. 9 and 11*a*, for reception within slot 47 of the cutter holder 41, as shown in FIG. 9. The reduced-thickness section 73 of the mounting plate is formed with a curved recess 79 to facilitate finger-gripping the cutter member when applying it to or removing it from the cutter holder 41.

Figure 10A:
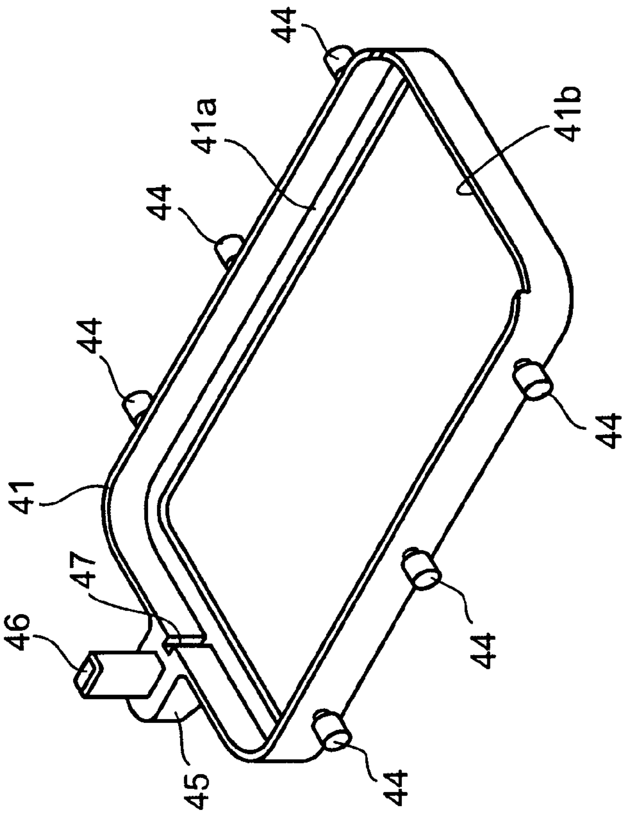
FIGS. 10*a*-10*c* are various views illustrating the cutter holder in the cutter device of FIG. 9.
Figure 10B:
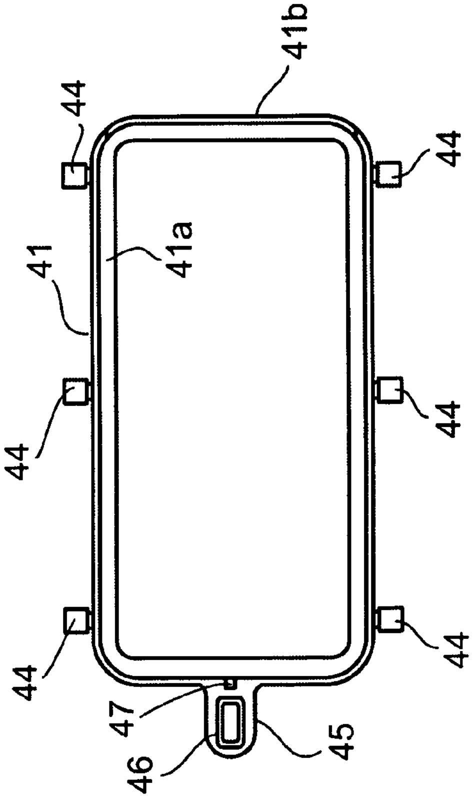
Figure 10C:
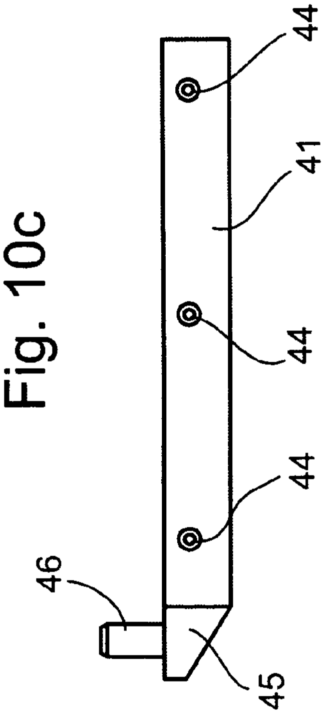
Figure 11A:
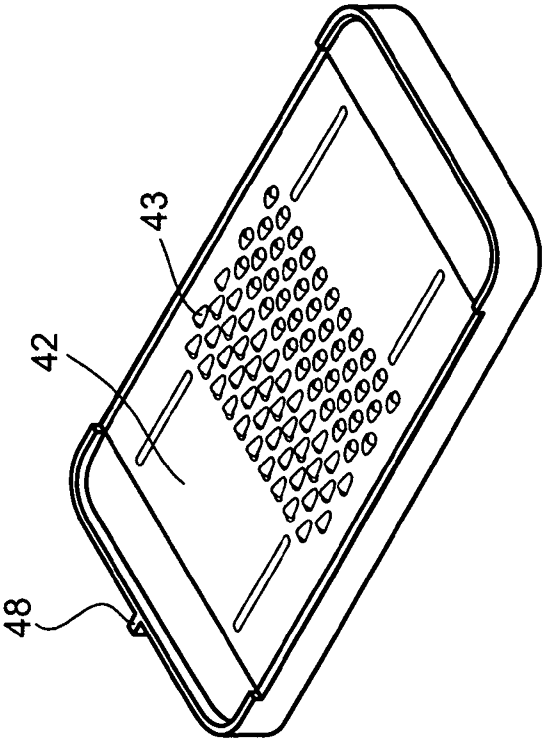
FIGS. 11*a*-11*d* are various views of the cutter member included in the cutter device of FIG. 9.
Figure 11D:
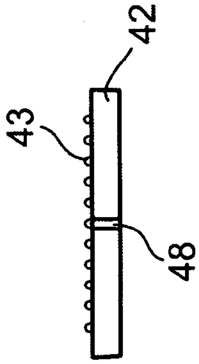
Figure 11B:
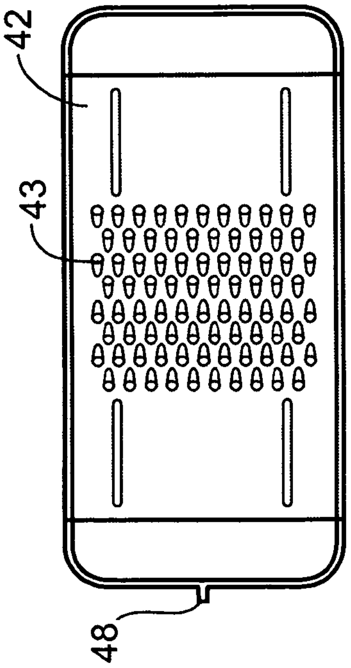
Figure 11C:
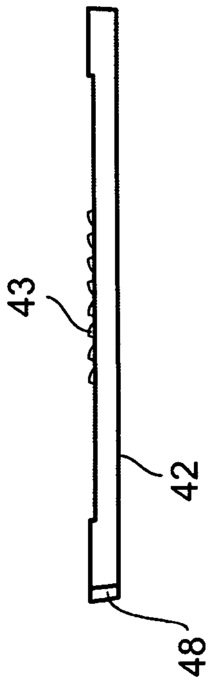
Figure 12A:
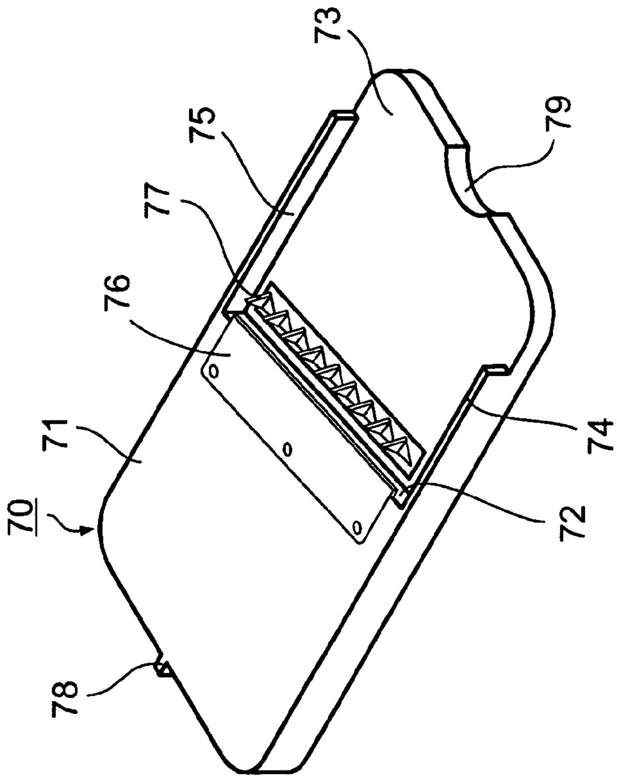
FIGS. 12*a*-12*d* are various views of another type of cutter member which may be conveniently used in the cutter device of FIG. 9.
Figure 12B:
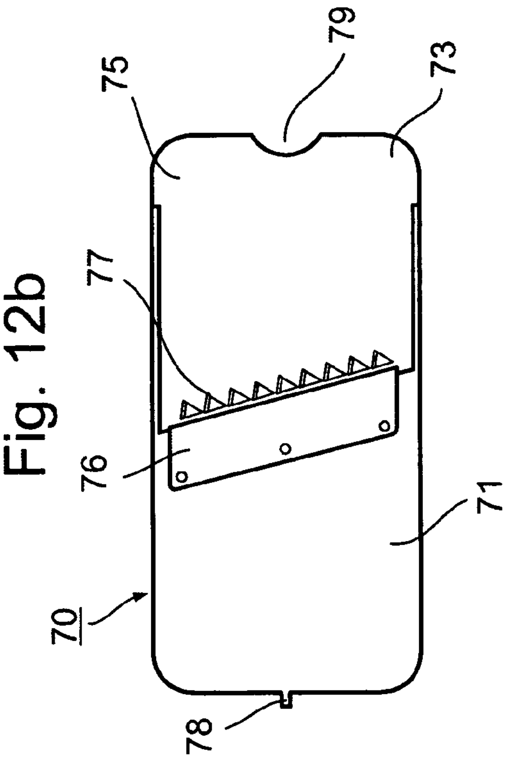
Figure 12C:
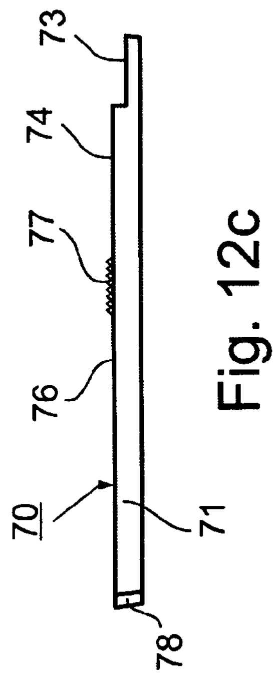
Figure 12D:
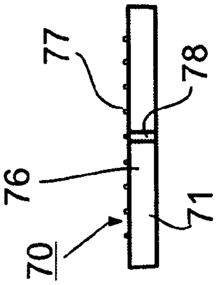
Figure 13A:
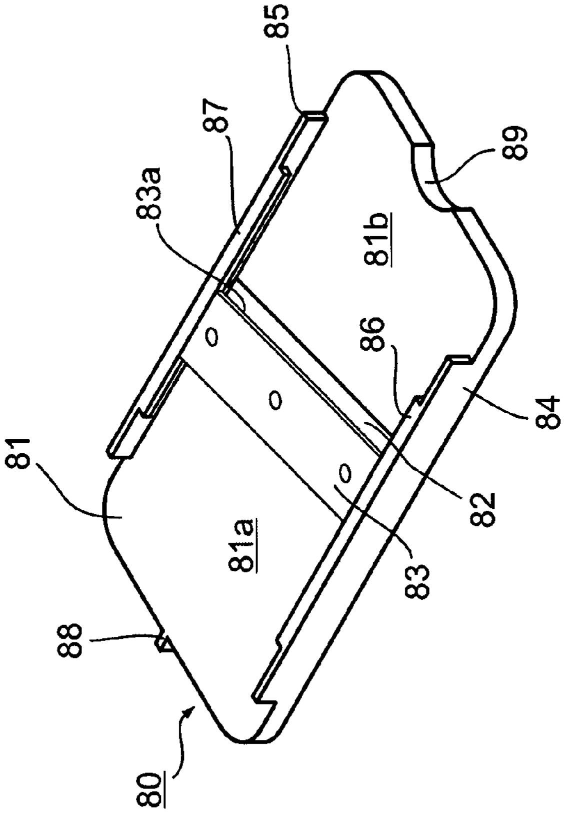
FIGS. 13*a*-13*d* are various views of a further type of cutter member which may be used in the cutter device of FIG. 9.
Figure 13B:
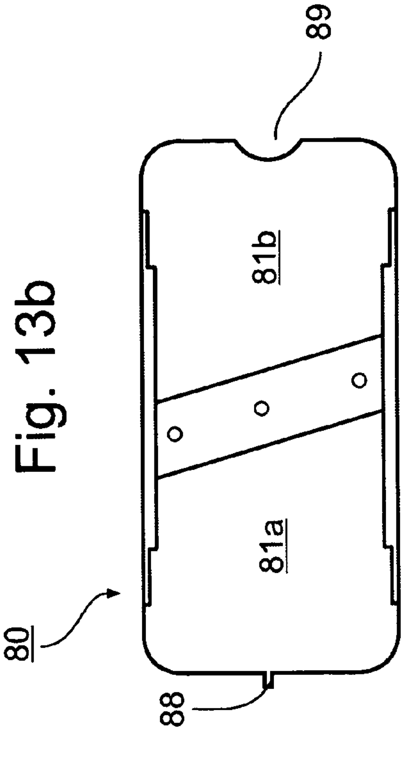
Figure 13D:
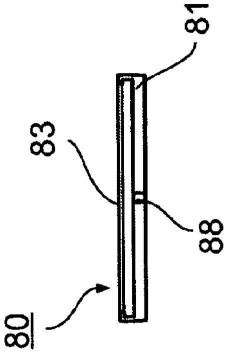
Figure 13C:
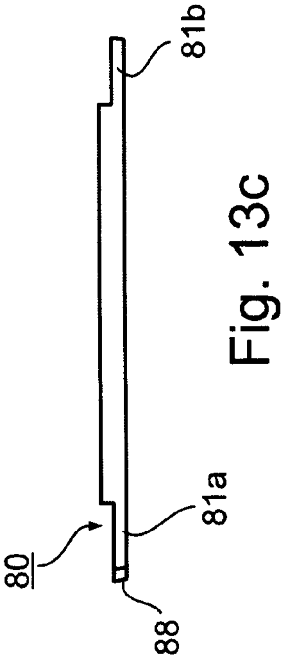
Figures 14A, 14B, 14C, 14D:
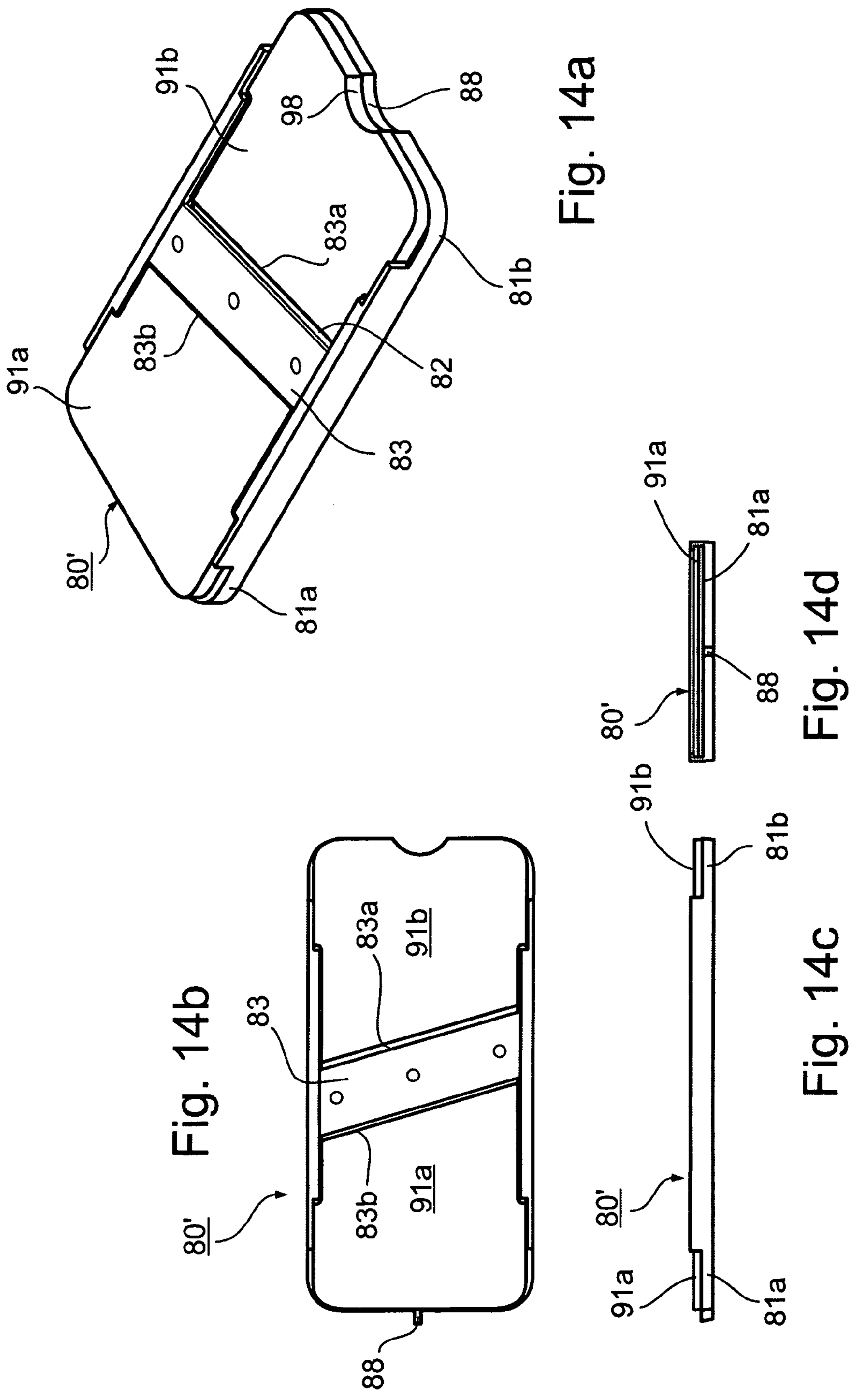
FIGS. 14*a*-14*d* are various views of a still further type of cutter member which may be used in the cutter device of FIG. 9.
Figure 15A:
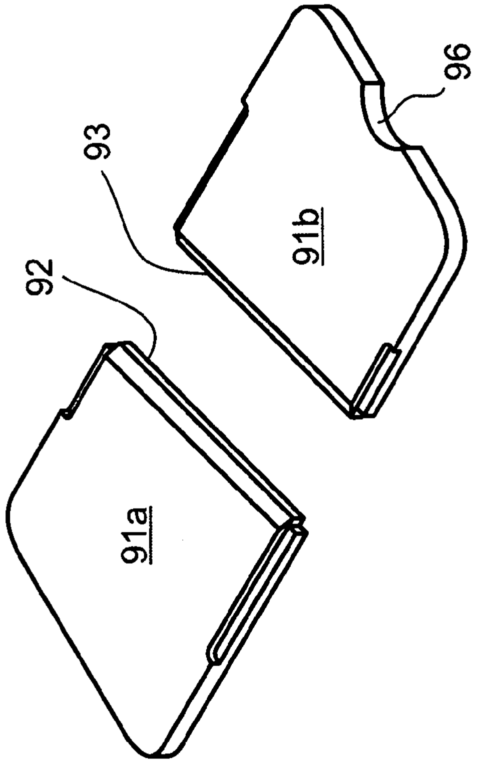
FIGS. 15*a*-15*e* are various views of inserts which may be used with the cutter device of FIGS. 14*a*-14*d* to vary the thickness of the slices produced thereby.
Figure 15B:
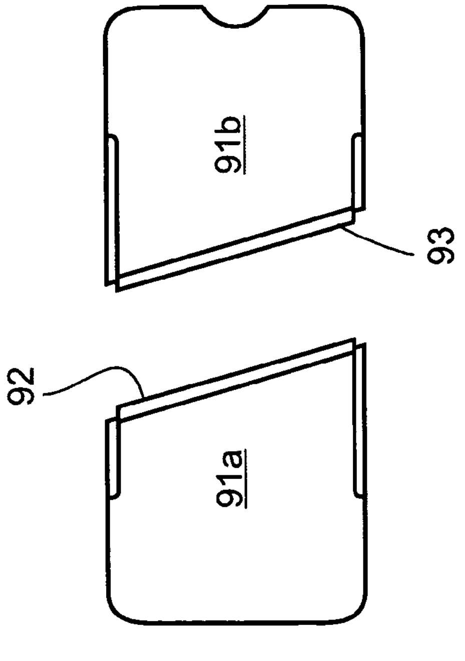
Figure 15C:
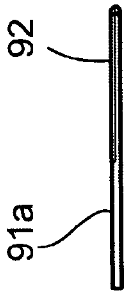
Figure 15D:
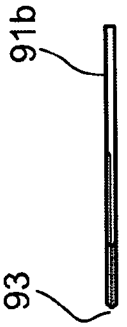
Figure 15E:
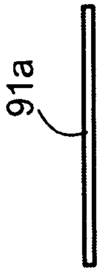

It will thus be seen that when cutter member 70 is applied to cutter holder 41 of FIGS. 9 and 10*a*, blade 76 extends horizontally parallel to the removable top wall 24 of housing 2, and blade 77 extends substantially vertically with respect to that wall, such that the reciprocations of the cutter member, during the operation of the appliance, will cut the food articles fed via the feed chute 3 into longitudinally-extending strips or sticks.

FIGS. 13*a*-13*d* illustrate another cutter member, generally designated 80, effective to cut the food articles into slices. Cutter member 80 includes a mounting plate 81 divided into two reduced-thickness sections 81*a*, 81*b*, separated at its mid-portion by a diagonally-extending strip 82. A cutter blade 83 is fixed to the mid-section 82, and is formed with a cutting edge 83*a* projecting slightly outwardly of the mid-section 82. The two end sections 81*a*, 81*b*, and the mid-section 82 are bordered on opposite sides by upstanding walls 84, 85, each formed with an in-turned flange 86, 87. One end of mounting plate 81 is formed with an axially-extending tab 88, corresponding to axial tab 78 in cutter member 70 of FIG. 12*a*, whereas the opposite end is formed with a curved recess 89, corresponding to curved recess 79 in cutter member 70 of FIG. 12*a*.

It will be seen that cutter member 80 may be conveniently applied to the cutter holder 41 by merely finger-grasping the mounting plate 81 via finger-gripping recess 89 and inserting tab 88 into slot 47 of the cutter holder, as described above with respect to FIGS. 12*a*-12*d*. It will also be seen that when cutter member 80 is used, each reciprocation of the cutter member will cut-off a slice of the food article fed through the feed chute.

FIGS. 14*a*-14*d* illustrate a cutter member, therein generally designated 80', of substantially the same construction as cutter member 80 in FIGS. 13*a*-13*d*, and therefore to facilitate to understanding, corresponding parts have been identified by the same reference numerals. Cutter member 80' illustrated in FIGS. 14*a*-14*d*, however, include two variations.

One variation is that the horizontal blade 83 includes two cutting edges 83*a* and 83*b*, such that using that cutter member produces a slice of the food article during each forward movement and also during each return movement of the cutter member.

Another variation is included in the cutter member 80' illustrated in FIGS. 14*a*-14*d* in that it includes an insert 91*a*, 91*b*, respectively, adapted to be inserted over each of the two sections 81*a*, 81*b* of the mounting plate 81. Each insert 91*a*,

91*b*, is of the same shape as its corresponding section of the mounting plate, and is of a thickness to decrease the distance between its upper surface and the cutting edge 83*a*, 83*b*, of the cutting blade 83, such that when the insert is used, it effectively reduces the thickness of the slice cut from the food article. The edge of insert 91*b* to overlie section 81*b* of the mounting plate is formed with a circular recess 98 corresponding to recess 88 of the mounting plate, to facilitate the application of the cutter member, when including the inserts, into the cutter holder as described above.

FIGS. 15*a*-15*e* more particularly illustrate the construction of each of the inserts 91*a*, 91*b*. It will be seen that their confronting edges 92, 93 are formed at a diagonal, and are also tapered. The construction is such that when cutting blade 83 is applied thereover, as shown particularly in FIG. 14*a*, they cooperate with the cutting edges 83*a*, 83*b* of the cutting blade to neatly cut a slice of the food article, not only during each forward reciprocation of the cutter member, but also during each backward reciprocation of the cutter member.

It will be appreciated that if more than two different thicknesses of slices are desired, several inserts of different thicknesses may be provided for selective introduction into the cutter member. It will also be appreciated that if it is desired to cut the food articles into thick and thin slices alternating with each other, an insert may be applied to only one side of the cutter member.

The manner of using the food cutter appliance illustrated in the drawings will be apparent from the above description. Thus, when the appliance is assembled as illustrated in FIG. 1 and described above, the food articles to be cut may be manually introduced into feed chute 3 and manually pushed therethrough by pusher member 5, into engagement with the cutter device 4 within housing 2. The energization of the electrical motor within the electrical drive unit 6 will reciprocate the cutter device 4 and cut the food article into the form as determined by the cutter member applied to holder 41 of the cutter device. The cuttings produced by the appliance are received within receptacle 23. FIG. 1 illustrates the appliance as including cutter member 42 (FIGS. 9 and 11*a*) of the shredder type, such that the cuttings by the operation of the appliance will be in the form of shreddings.

If it is desired to cut the food articles into other forms, top wall 23 of the housing 2 is removed to expose cutter device 4, whereupon the cutter member within cutter holder 41 may be conveniently replaced according to the desired form of cuttings to be produced. For example, if longitudinally-extending sticks or strips are to be produced, cutter holder 70 illustrated in FIGS. 12*a*-12*d* would be applied in place of the shredder plate 42.

The arrangement for locking the removable top wall 24 in the upper end of housing member 21, including pin 21*b* in the housing member, opening 24*b* in the top wall peripheral flange 24*a* and the friction fit between peripheral flange 24*a* and the thickened rim 21*a* of the housing member, permit convenient and secure arrangement of the removable top wall and convenient detachment thereof for cleaning purposes, cutter-member changing purposes, etc.

The hand gripping recesses, 61, 62 of the electrical drive unit 6 facilitate the application and removal of the drive unit together with the top wall 24. The provision of interlock switch 68 (FIGS. 3, 4), cooperable with the projection 33 of the feed chute 3, assures that the electrical motor within drive unit 6 will be disabled from operation unless the drive unit is properly positioned with respect to the feed chute and top wall 24. The same operations may be performed for removing the cutter member in order to wash it after use, and/or for removing receptacle 23 containing the cuttings produced by the operation of the appliance. The provision of the removable liner 22 enables the interior of housing 2 also to be conveniently cleaned or washed.

While the invention has been described with respect to one preferred embodiment, it will be appreciated that this is set forth merely for purposes of example, and that many other variations, modifications and applications of the invention may be made.

What is claimed is:

1. A food processor appliance for cutting food articles into a desired form, comprising:

a housing including a removable top wall;

a feed chute carried by said top wall, and removable therewith, said feed chute having an inlet end projecting outwardly of said top wall, and an outlet end leading through said top wall into the housing;

a pusher member for pushing food articles through said feed chute into said housing;

a cutter device within said housing and aligned with said outlet end of the feed chute, said cutter device being mounted for reciprocatory forward and return movements transversely across said outlet end of the feed chute for cutting food articles fed therethrough into the desired form;

and an electrical drive unit including an electrical motor controlled by an on/off switch for reciprocating said cutter device;

said electrical drive unit being conveniently attachable to said housing, with a side of the electrical drive unit engaging a side of the feed chute, for reciprocating said cutter device, and being removable from said housing to facilitate cleaning the cutting device;

said electrical drive unit including an interlock normally disabling said drive unit, but actuatable to enable said drive unit;

said feed chute including an actuator extending laterally of said side thereof for actuating said interlock, and thereby enabling said drive unit, when the drive unit is located in its proper position on said top wall of the housing and attached thereto.

2. The appliance according to claim 1, wherein said actuator includes a pin fixed to and extending laterally of said feed chute, said pin being receivable in a socket in said side of said electrical drive unit such that said pin, when received in said electrical drive unit, also properly locates the electrical drive unit on said housing top wall.

3. The appliance according to claim 2, wherein:

said feed chute is of a cylindrical configuration and the side thereof facing said electrical drive unit includes said laterally-extending pin;

the side of said electrical drive unit formed with said socket includes a curved recess conforming to the curvature of said feed chute;

and the bottom of said electrical drive unit is formed with two further sockets for receiving pins formed at the respective end of the housing top wall to precisely locate the electrical drive unit with respect to said feed chute and housing top wall.

4. The appliance according to claim 1, wherein said removable top wall is formed with a depending peripheral flange dimensioned to receive the upper end of the housing with a friction fit, one end of the housing being formed with an outwardly projecting pin adapted to be received in an opening formed in the corresponding end of said depending peripheral flange of the removable top wall to firmly lock said top wall to the housing.

5. The appliance according to claim 1, wherein said electrical drive unit includes a top wall and opposed side walls formed with recesses configured to serve as hand grips facilitating grasping the electrical drive unit for application to, or removal of, the electrical drive unit with respect to said housing top wall.

6. The appliance according to claim 1, wherein said cutter device includes a cutter holder coupleable to said electrical drive unit so as to be reciprocated thereby, and a cutter member removably carried by said cutter holder.

7. The appliance according to claim 6, wherein said cutter member includes:

a first blade extending transversely across the path of movement of the cutter holder during its reciprocations;

and a group of spaced further blades extending perpendicularly to said first blade and parallel to said path of movement of the cutter holder during its reciprocations, such that the cutter member cuts the food articles into longitudinally-extending strips.

8. The appliance according to claim 7, wherein said first blade extends substantially horizontally parallel to said removable top wall of the housing, and said group of spaced further blades extends substantially vertically with respect to said removable top wall of the housing.

9. The appliance according to claim 6, wherein said cutter member includes a blade extending transversely across the path of movement of the cutter holder during its reciprocations; said blade having a cutting edge on each of its opposite ends such as to cut a slice of the food article during both the forward and return reciprocatory movements of the cutter device.

10. The appliance according to claim 6, wherein said cutter member includes a shredder plate for shredding the food articles.

11. The appliance according to claim 1, wherein said cutter device includes a cutter holder coupleable to said electrical drive unit so as to be reciprocated thereby; and wherein said appliance further includes a plurality of different types of cutter members selectively receivable in said cutter holder for cutting the food articles into the desired form.

12. The appliance according to claim 11, wherein one type of cutter member selectively receivable in said cutter holder includes a first blade extending transversely across the path of movement of the cutter holder during its reciprocations;

and a group of spaced further blades extending perpendicularly to said first blade and parallel to said path of movement of the cutter holder during its reciprocations, such that the cutter member cuts the food articles into longitudinally-extending strips.

13. The appliance according to claim 12, wherein said first blade extends substantially horizontally parallel to said removable top wall of the housing, and said group of spaced further blades extends substantially vertically with respect to said removable top wall of the housing.

14. The appliance according to claim 11, wherein one type of cutter member selectively receivable in said cutter holder includes a blade extending transversely across the path of movement of the cutter holder during its reciprocations; said blade having a cutting edge on each of its opposite ends such as to cut a slice of the food article during both the forward and return reciprocatory movements of the cutter device.

15. The appliance according to claim 11, wherein one type of cutter member includes a shredder plate for shredding the food articles.

16. The appliance according to claim 11, wherein one type of cutter member includes a blade extending transversely across the path of movement of the cutter holder during its reciprocations, said blade having at least one cutting edge for cutting the food articles into slices during each of the reciprocatory movements of the cutter holder.

17. The appliance according to claim 1, wherein said appliance further comprises a receptacle underlying said cutter device and removable from said housing for receiving and removing the food articles after cut by said cutter device.

* * * * *